US010677599B2

(12) United States Patent
Zavesky et al.

(10) Patent No.: US 10,677,599 B2
(45) Date of Patent: Jun. 9, 2020

(54) SYSTEMS AND METHODS FOR PROVIDING IMPROVED NAVIGATION THROUGH INTERACTIVE SUGGESTION OF IMPROVED SOLUTIONS ALONG A PATH OF WAYPOINTS

(71) Applicant: AT&T Intellectual Property I, L.P., Atlanta, GA (US)

(72) Inventors: Eric Zavesky, Austin, TX (US); Donald Perciful, Austin, TX (US); James Pratt, Round Rock, TX (US); Robert Dailey, Austin, TX (US); Yupeng Jia, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 92 days.

(21) Appl. No.: 15/601,048

(22) Filed: May 22, 2017

(65) Prior Publication Data
US 2018/0335308 A1 Nov. 22, 2018

(51) Int. Cl.
*G01C 21/34* (2006.01)
*G01C 21/36* (2006.01)

(52) U.S. Cl.
CPC ..... *G01C 21/3415* (2013.01); *G01C 21/3484* (2013.01); *G01C 21/3492* (2013.01); *G01C 21/3629* (2013.01); *G01C 21/3641* (2013.01); *G01C 21/3652* (2013.01); *G01C 21/3676* (2013.01); *G01C 21/362* (2013.01); *G01C 21/3614* (2013.01); *G01C 21/3617* (2013.01);
(Continued)

(58) Field of Classification Search
USPC .................................................. 701/400–541
See application file for complete search history.

(56) References Cited

U.S. PATENT DOCUMENTS 5,712,632 A * 1/1998 Nishimura ......... G01C 21/3492
340/995.19
5,948,040 A * 9/1999 DeLorme ............... G01C 21/36
340/990
(Continued)

FOREIGN PATENT DOCUMENTS

EP 0120195 B1 9/1989
EP 2233887 A1 9/2010
(Continued)

OTHER PUBLICATIONS

Taylor et al.; "Spatial Mental Representation: Implications for Navigation System Design"; Reviews of Human Factors and Ergonomics; Chapter 1 - 4.1; 2008; 40 pages.
(Continued)

*Primary Examiner* — Jonathan L Sample
(74) *Attorney, Agent, or Firm* — BakerHostetler

(57) ABSTRACT

A method and system for providing improved navigation through interactive suggestion of improve solutions along a path of waypoints includes receiving in a user device a destination for a user. Data associated with the destination is transmitted to a network as well as information correlated to a location of the user. Data associated with at least one modified waypoint for an improved navigation solution is received from the network. The modified waypoints are determined in accordance with a set of parameters. Task and notification information are received from the network.

17 Claims, 6 Drawing Sheets

(52) U.S. Cl.
CPC ..... *G01C 21/3673* (2013.01); *G01C 21/3682* (2013.01); *G01C 21/3697* (2013.01)

(56) References Cited

U.S. PATENT DOCUMENTS

| | | | |
|---|---|---|---|
| 6,101,443 A | 8/2000 | Kato et al. | |
| 6,119,065 A * | 9/2000 | Shimada | G01C 21/20 340/944 |
| 6,259,990 B1 * | 7/2001 | Shojima | G01C 21/20 701/420 |
| 6,330,453 B1 * | 12/2001 | Suzuki | G01C 21/32 455/457 |
| 6,708,112 B1 * | 3/2004 | Beesley | G01C 21/30 340/990 |
| 6,934,634 B1 * | 8/2005 | Ge | G06F 16/29 702/2 |
| 7,103,470 B2 | 9/2006 | Mintz | |
| 7,174,154 B2 * | 2/2007 | Ehlers | G08G 1/096811 455/404.2 |
| 7,363,153 B2 | 4/2008 | Nam et al. | |
| 7,363,319 B2 | 4/2008 | Cappellini | |
| 7,388,519 B1 * | 6/2008 | Kreft | G06Q 10/047 340/995.1 |
| 7,440,847 B2 * | 10/2008 | Unuma | G01C 21/20 342/357.31 |
| 7,511,736 B2 | 3/2009 | Benton | |
| 7,640,104 B2 | 12/2009 | Ramaswamy et al. | |
| 7,826,965 B2 * | 11/2010 | Sadri | G01C 21/20 340/905 |
| 7,831,381 B2 * | 11/2010 | Thota | G01C 21/3679 701/426 |
| 7,831,433 B1 * | 11/2010 | Belvin | G10L 15/18 704/275 |
| 8,068,981 B2 | 11/2011 | Liberto et al. | |
| 8,082,095 B2 | 12/2011 | Sumcad et al. | |
| 8,200,424 B2 * | 6/2012 | Mitsugi | G01C 21/20 340/990 |
| 8,660,790 B2 | 2/2014 | Stahl et al. | |
| 8,676,489 B2 * | 3/2014 | Cheung | G01C 21/367 701/400 |
| 8,751,152 B2 * | 6/2014 | Geelen | G01C 21/3655 701/410 |
| 8,977,489 B2 * | 3/2015 | Szczerba | G01S 13/931 701/428 |
| 9,008,888 B1 | 4/2015 | Gravino et al. | |
| 9,200,911 B2 | 12/2015 | Tucker | |
| 10,215,583 B2 * | 2/2019 | Ng-Thow-Hing | H04N 7/188 |
| 2002/0087262 A1 * | 7/2002 | Bullock | G01C 21/3446 701/421 |
| 2002/0091485 A1 * | 7/2002 | Mikuriya | G01C 21/32 701/450 |
| 2002/0188399 A1 * | 12/2002 | Odagawa | G01C 21/3461 701/533 |
| 2004/0008225 A1 * | 1/2004 | Campbell | G01C 21/367 715/764 |
| 2004/0122591 A1 | 6/2004 | MacPhail | |
| 2005/0140524 A1 * | 6/2005 | Kato | G08G 1/096811 340/995.13 |
| 2005/0149262 A1 * | 7/2005 | Oikubo | G01C 21/3658 701/431 |
| 2005/0171690 A1 * | 8/2005 | Brass | G01C 21/365 701/431 |
| 2005/0203698 A1 * | 9/2005 | Lee | G01C 21/32 701/532 |
| 2006/0074547 A1 * | 4/2006 | Kaufman | G01C 21/32 701/451 |
| 2006/0173614 A1 * | 8/2006 | Nomura | G01C 21/32 701/425 |
| 2006/0265294 A1 * | 11/2006 | de Sylva | G06Q 10/087 705/28 |
| 2006/0287815 A1 * | 12/2006 | Gluck | G01C 21/3632 701/436 |
| 2008/0033633 A1 * | 2/2008 | Akiyoshi | G01C 21/343 701/418 |
| 2008/0270019 A1 | 10/2008 | Anderson et al. | |
| 2009/0018767 A1 * | 1/2009 | Gehring | B60W 40/072 701/533 |
| 2009/0192702 A1 * | 7/2009 | Bourne | G01C 21/20 701/532 |
| 2010/0256903 A1 | 10/2010 | Johnson | |
| 2010/0268460 A1 | 10/2010 | Wan et al. | |
| 2010/0305847 A1 * | 12/2010 | Gluck | G01C 21/3667 701/533 |
| 2010/0318291 A1 * | 12/2010 | Gluck | G01C 21/367 701/532 |
| 2011/0161001 A1 * | 6/2011 | Fink | G01C 21/3617 701/533 |
| 2011/0228078 A1 | 9/2011 | Chen et al. | |
| 2012/0069131 A1 * | 3/2012 | Abelow | G06Q 10/067 348/14.01 |
| 2012/0226437 A1 | 9/2012 | Li et al. | |
| 2013/0275899 A1 * | 10/2013 | Schubert | G06F 3/0481 715/765 |
| 2013/0332077 A1 * | 12/2013 | Khetan | G08G 1/0962 701/533 |
| 2014/0006631 A1 * | 1/2014 | Meskauskas | G06T 11/60 709/227 |
| 2014/0018996 A1 * | 1/2014 | Mian | G05D 1/0274 701/26 |
| 2014/0046585 A1 | 2/2014 | Morris, IV et al. | |
| 2014/0107917 A1 * | 4/2014 | Kazawa | G01C 21/3682 701/426 |
| 2014/0195155 A1 * | 7/2014 | Aist | G01C 21/3484 701/533 |
| 2014/0257693 A1 * | 9/2014 | Ehlers | G01C 21/3461 701/522 |
| 2014/0306814 A1 * | 10/2014 | Ricci | G01C 21/3484 340/425.5 |
| 2014/0309863 A1 * | 10/2014 | Ricci | G01C 21/3484 701/36 |
| 2014/0309864 A1 * | 10/2014 | Ricci | A61B 5/0077 701/36 |
| 2014/0309935 A1 * | 10/2014 | Ricci | G08B 13/19647 701/540 |
| 2014/0330739 A1 | 11/2014 | Falcone et al. | |
| 2015/0006072 A1 | 1/2015 | Goldberg et al. | |
| 2015/0032366 A1 * | 1/2015 | Man | G08G 1/096741 701/412 |
| 2015/0109334 A1 | 4/2015 | Park et al. | |
| 2015/0241239 A1 * | 8/2015 | van Dok | G01C 21/3664 701/538 |
| 2015/0247737 A1 * | 9/2015 | van Dok | G01C 21/3691 701/431 |
| 2015/0319093 A1 * | 11/2015 | Stolfus | H04L 12/6418 370/237 |
| 2015/0347964 A1 | 12/2015 | Taylor | |
| 2016/0076906 A1 | 3/2016 | Hinnegan | |
| 2016/0123761 A1 * | 5/2016 | Van Wieringen | G01C 21/3697 701/465 |
| 2016/0284125 A1 | 9/2016 | Bostick et al. | |
| 2016/0356611 A1 * | 12/2016 | Glasgow | H04L 67/42 |
| 2017/0174215 A1 * | 6/2017 | Tseng | B60W 10/20 |
| 2017/0215031 A1 * | 7/2017 | Harding | G01C 21/362 |
| 2017/0262790 A1 * | 9/2017 | Khasis | G01C 21/3415 |
| 2018/0135989 A1 * | 5/2018 | Schreier | G01C 21/3415 |
| 2018/0309592 A1 * | 10/2018 | Stolfus | G08G 1/0965 |
| 2018/0335308 A1 * | 11/2018 | Zavesky | G01C 21/3484 |

FOREIGN PATENT DOCUMENTS

| | | |
|---|---|---|
| WO | WO 1997/048065 A1 | 12/1997 |
| WO | WO 2011/066468 A1 | 6/2011 |

OTHER PUBLICATIONS

Schmalsteig et al.; "The World as a User Interface: Augmented Reality for Ubiquitous Computing"; Central European Multimedia

(56) References Cited

OTHER PUBLICATIONS and Virtual Reality Conf.; 2005; 10 pages.
Petereit et al.; "Safe Mobile Robot Motion Planning for Waypoint Sequences in a Dynamic Environment"; IEEE Int'l Conf. Industrial Technology (ICIT); 2013; 7 pages.
Ku et al.; "Adaptive Nearest Neighbor Queries in Travel Time Networks"; Proceedings of the 13$^{th}$ Annual ACM Int'l Workshop on Geographic Information Systems; 2005; 9 pages.

* cited by examiner

SYSTEMS AND METHODS FOR PROVIDING IMPROVED NAVIGATION THROUGH INTERACTIVE SUGGESTION OF IMPROVED SOLUTIONS ALONG A PATH OF WAYPOINTS

TECHNICAL FIELD

The disclosure relates to navigation systems in general and more specifically to systems and methods for providing improved navigation through interactive suggestion of improved solutions along a path of waypoints.

BACKGROUND

Navigation currently requires knowing and inputting specific destination. In traditional navigation, a route is planned to the destination. More recently, electronic navigation has allowed the input of the destination and providing what is thought to be the quickest route to it based on calculations using Euclidian distance. Both classical navigation and electronic navigation suffer from the same limitations: inflexible routes based on a limited context.

Currently navigation requires a specific destination already known (e.g. an exact address). This extra cognitive load requires that the user plan exact waypoints, routing to those waypoints, and give extra attention to traffic avoidance or schedule requirements. Existing navigation systems do not provide for the addition of a complex set of tasks to be satisfied without the user actively having to plan and manage the tasks. Current systems do not provide for interactive suggestions of waypoints and the creation of dynamic paths based upon user preferences, identification of moving targets, general location, proximity to others, proximity to services, etc.).

There is a need for systems and methods of navigation that allow for greater user interactivity without demanding greater work from users. There is a need to provide richer interactions through and allow for customization, flexibility, and greater efficiency in navigation. There is a need in navigation systems to add a complex set of tasks that are ideally satisfied without the user actively having to plan and manage the tasks (e.g. a wish-list, tour, etc. can be specified once and forgotten). There is a need to utilize interaction between human and machine to improve the selection of waypoints along an origin and destination path and to provide non-static paths allow for increased socialization and variability for stops along a path. There is a need to leverage Augmented Reality and Machine Learning/automation systems to include ancillary information for user decision of task completion (guided, better informed, etc.) and to utilize real-time feedback for events and information along the way to provide users with an improved navigation experience. There is a need to provide systems connected to additional commerce and social organizations by providing more connectivity through ephemeral (you're in the neighborhood) and just-in-time (a new event was discovered) solicitation of users with shared interests.

SUMMARY

One general aspect includes a method including: receiving in a user device a destination for a user; transmitting data associated with the destination to a network; transmitting navigational information correlating to a location of the user to the network; receiving from the network, data associated with at least one modified waypoint for an improved navigation solution, the at least one modified waypoint being determined in accordance with a set of parameters; and receiving task and destination notifications from the net the at least one modified waypoint.

Implementations may include one or more of the following features. The method where the set of parameters includes parameters selected from among a group including: traffic conditions, proximity of an individual, social connections, user preferences, time of day, appointments in a calendar, specific tasks, and categorical parameters. The method further including: receiving from the network an offer to synchronize and manage planning of the at least one modified waypoint, where the offer to synchronize and manage is triggered by a trigger event; and transmitting to the network, an acceptance of the offer to synchronize and manage planning of the at least one modified waypoint. The method where the at least one modified waypoint is ordered according to an ordering criteria. The method where the ordering criteria includes an ordering criteria selected from among a group including quickest, closest, most valuable, most social. The method where ephemeral tasks and destination notifications are provided to one or more of a visual display, an audio device, or a haptic device. The method where the ephemeral tasks and destination notifications are provided in an augmented reality display.

One general aspect includes a system including: a processor, a global positioning system, a computer-readable medium in communication with the processor where the processor is configured to execute an application stored in the computer-readable medium for performing operations. The system also includes receiving in a user device a destination for a user. The system also includes transmitting data associated with the destination to a network. The system also includes transmitting navigational information correlating to a location of the user to the network. The system also includes receiving from the network, data associated with at least one modified waypoint for an improved navigation solution, the at least one modified waypoint being determined in accordance with a set of parameters. The system also includes receiving task and destination notifications from the network associated with the location of the user and the at least one modified waypoint.

One general aspect includes a non-transitory computer readable medium including computer executable instructions embodied in a computer readable medium and when executed by a processor of a computer performs steps including: receiving in a user device a destination for a user; transmitting data associated with the destination to a network; transmitting navigational information correlating to a location of the user to the network; receiving from the network, data associated with at least one modified waypoint for an improved navigation solution, the at least one modified waypoint being determined in accordance with a set of parameters; and receiving task and destination notifications from the network associated with the location of the user and the at least one modified waypoint.

BRIEF DESCRIPTION OF THE DRAWINGS

Aspects of the herein described systems and methods for optimized augmented reality navigation and waypoints are described more fully herein with reference to the accompanying drawings, in which example embodiments are shown. In the following description, for purposes of explanation, numerous specific details are set forth in order to provide an understanding of the various embodiments. However, the instant disclosure may be embodied in many different forms

DETAILED DESCRIPTION OF ILLUSTRATIVE EMBODIMENTS

Figure 1:
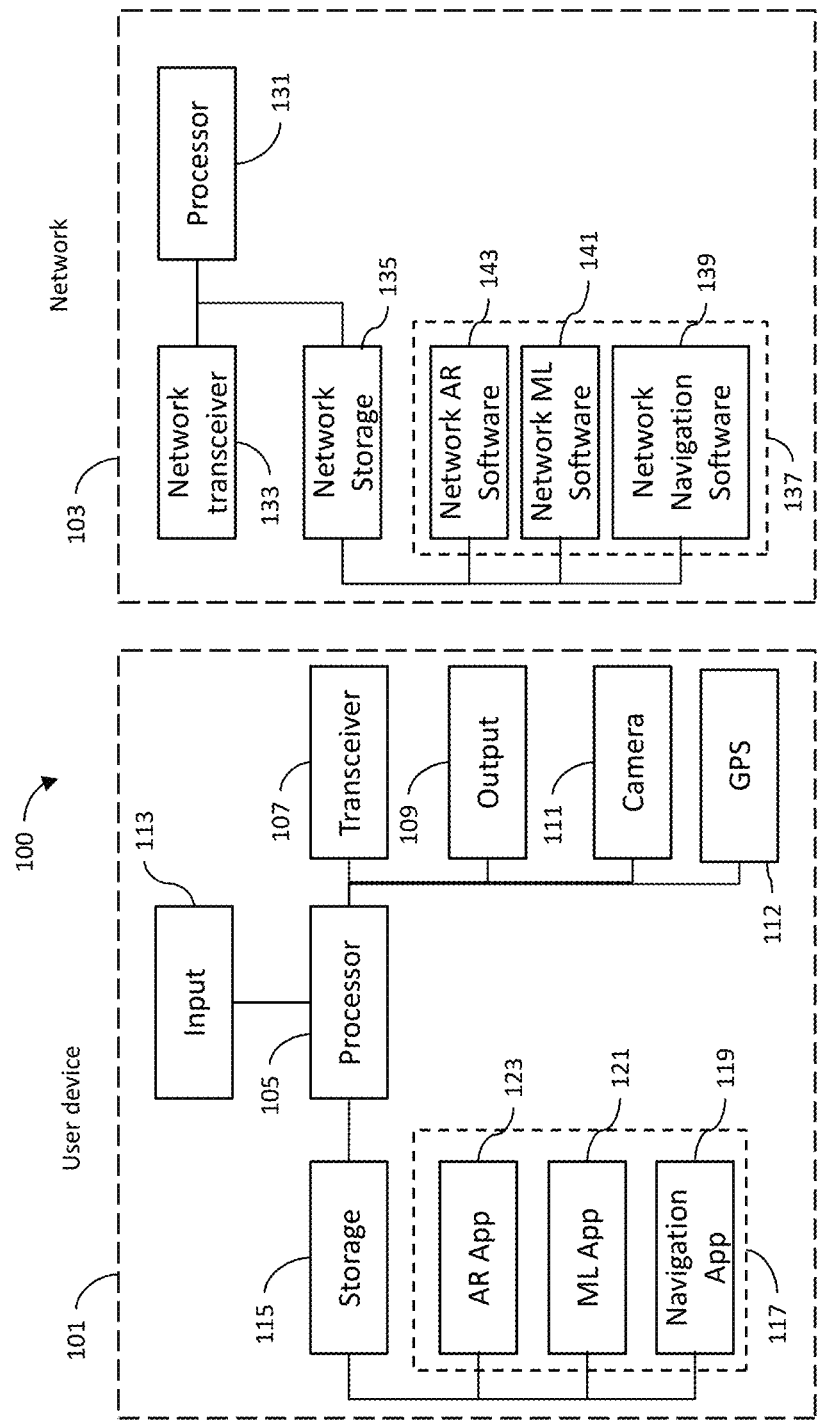
FIG. 1 is a block diagram of a navigation system according to an embodiment

Illustrated in FIG. 1 is a navigation system 100, including a user device 101 and a network 103. User device 103 may be a mobile device or portable device (e.g. mobile device, telephone, smart phone, PDA, laptop computer, Android, iOS devices, iPhone, 3G, 3GS, iPhone 4, iPad, iPod Touch, smartwatch, etc.). User device 103 includes a processor 105 coupled to a transceiver 107, an output device 109, a camera 111 and a GPS device 112. The output device 109 may be a visual display, and audio play device or a haptic device. The processor is also coupled to a user input device 113. User input device 113 may be any type of input device such as a keyboard, a pointing device, an audio input device a gesture recognition device, a digital pen or a touch screen. The user device 103 also includes non-transitory storage media 115, which may include any type of computer storage device such as a RAM memory, flash memory, ROM memory, EPROM memory, EEPROM memory, registers, hard disk, a removable disk, or a CD-ROM. Stored in the non-transitory storage media are a plurality of applications 117 which may include navigation application 119, machine learning application 121 and augmented reality application 123, among others. Navigation application 119 may employ GPS device 112 and enable the user to input a destination address and waypoint from the current location to the destination address. The navigation application 119 then calculates a route to the destination address including the intermediate waypoints and displays instructions on how to navigate the route. Machine learning application 119, comprises any known machine learning algorithms to process user input and infer user preferences from the use of the navigation application 119 and other applications. One embodiment is the analysis of previous user waypoints and routes to learn and predict preferences, such as the choice of scenic routes or toll roads or a user preference used to bias waypoint priorities by their type. Another embodiment may couple machine learning with augmented reality to identify and execute actions from user gestures. For example, a user may choose to dismiss navigation options by swiping a hand away or may indicate a need to visit a common social meeting point (e.g. a coffee shop) by first digitally socializing with friends and then immediately speaking the phrase "let's recharge our batteries" in the presence of the navigation system. Augmented reality application 123 superimposes graphics, audio and other sensory enhancements over a real world environment in real time. In an example, an observable scene may be captured by camera 111. The augmented reality application 123 renders additions to the environment based on an environment model that contains information required to display information of interest such as navigational aids and the like. Such display is usually provided as an overlay, and may be may be a photo-realistic rendition of objects, a cartographical rendition, navigational data, and the like. In some cases, the most effective rendition comprises icons, textual data, pointers, and the like. Augmented reality environment models may comprise a combination of computer generated graphics with actual photographic data.

Network 103 includes a processor 131 which may be any computer such as a server. Processor 131 may be coupled to a network transceiver 133 and network storage 135. A plurality of software applications 137 may be stored in network storage 135, including Network navigation software 139, network machine learning software 141 and network augmented reality software 141.

Figure 2:
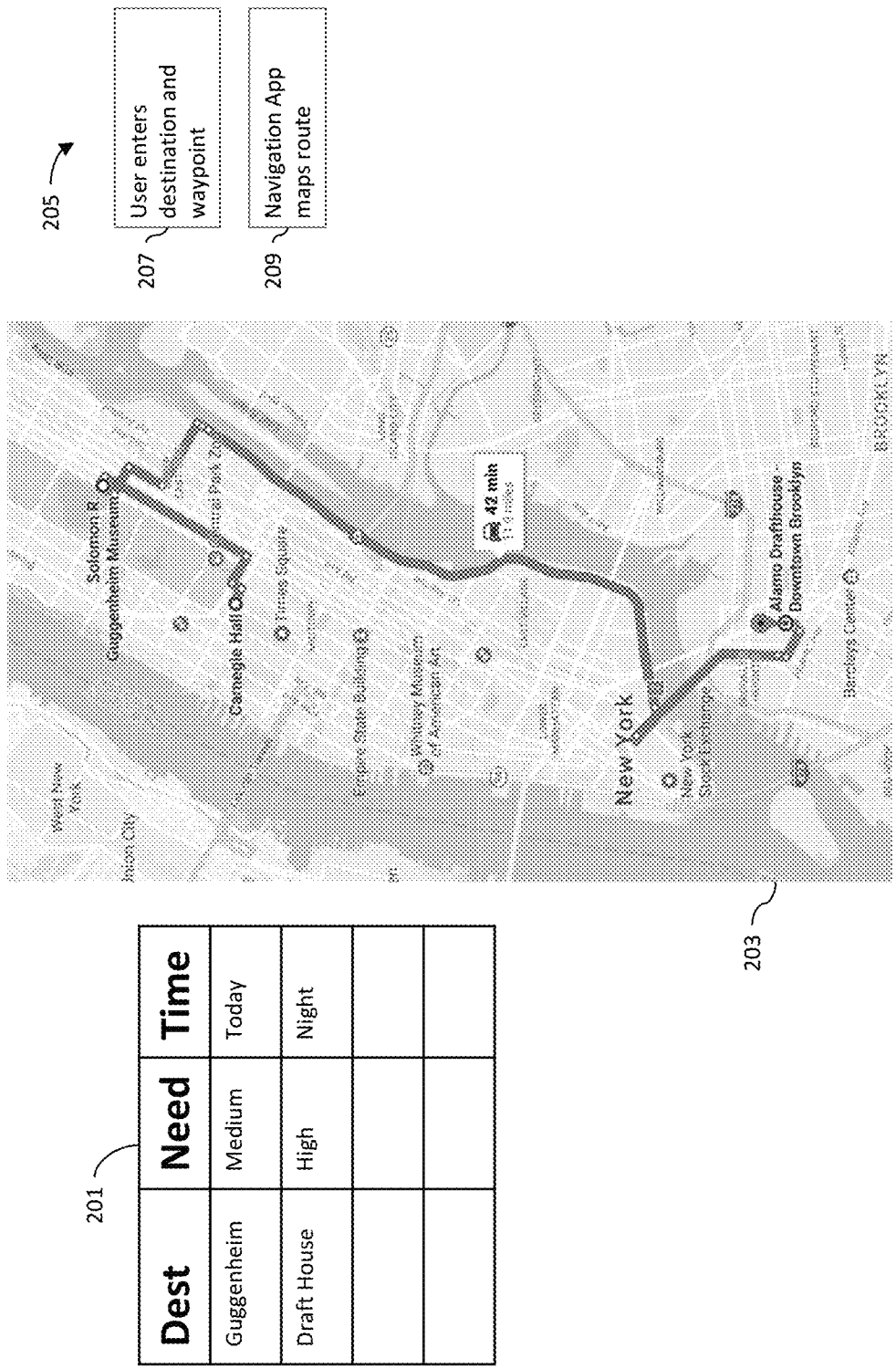
FIG. 2 illustrates an example of the operation of an embodiment a navigation system.
Figure 3:
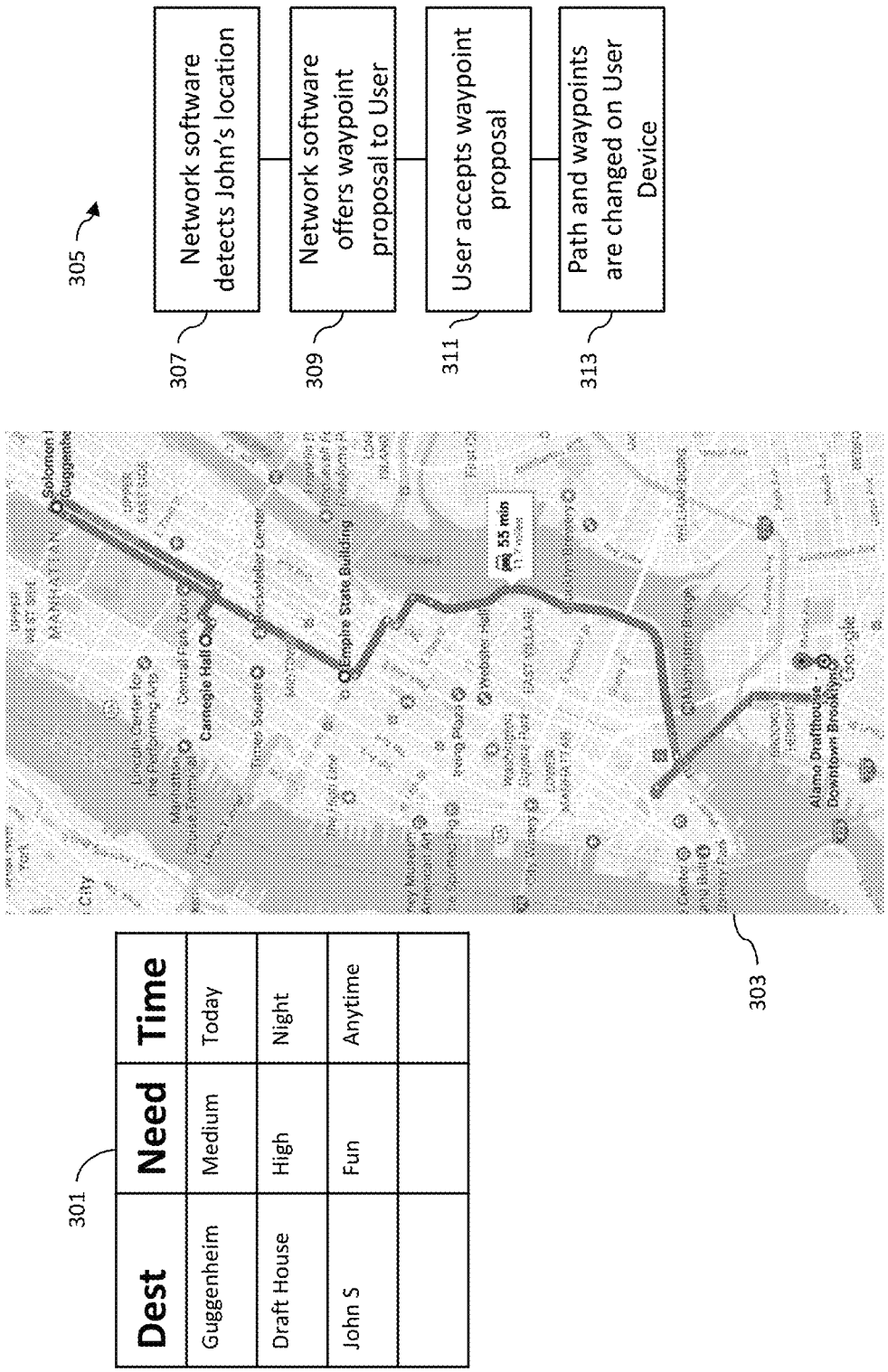
FIG. 3 illustrates an example of the operation of an embodiment a navigation system.
Figure 4:
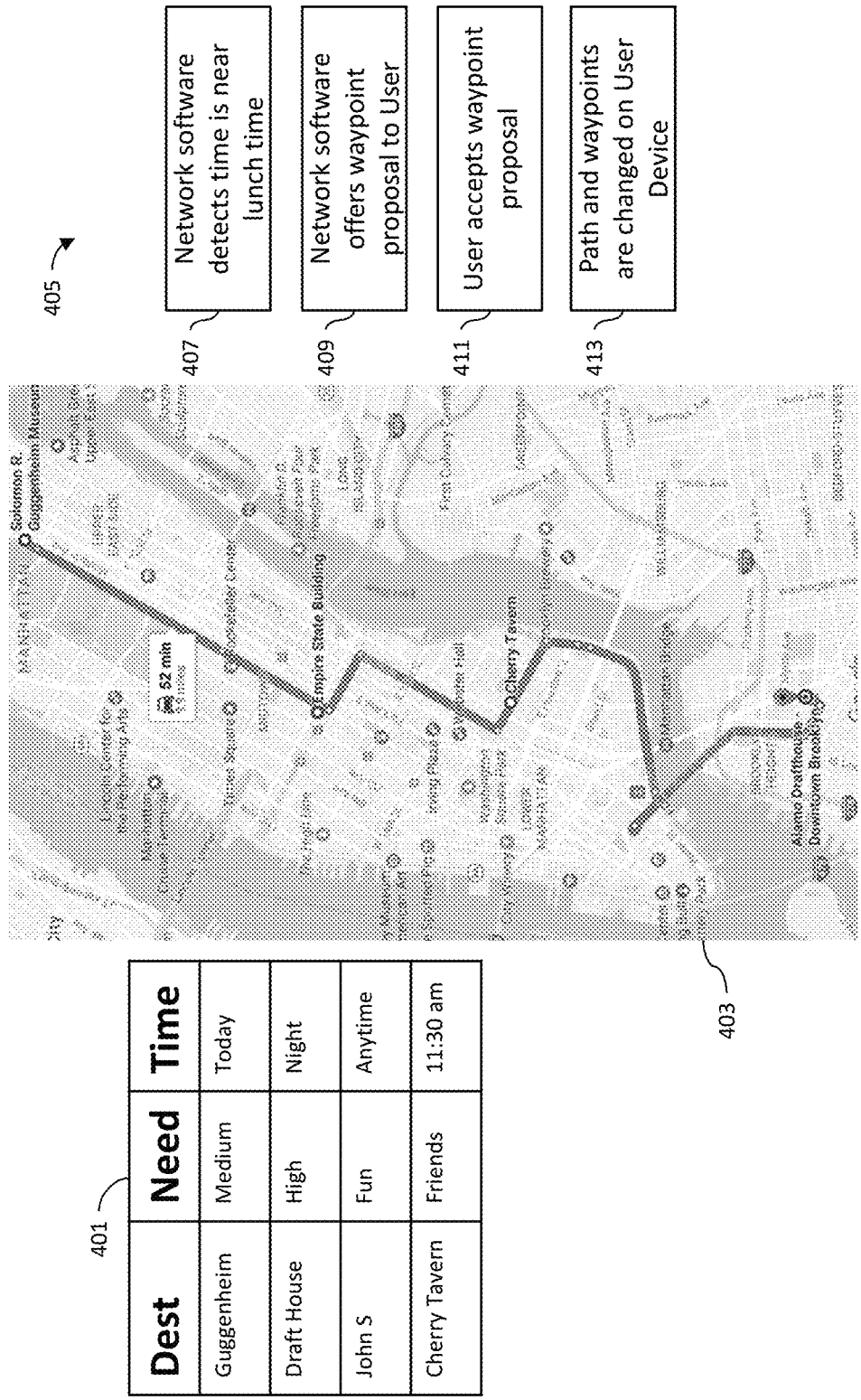
FIG. 4 illustrates an example of the operation of an embodiment a navigation system.

FIGS. 2, 3, and 4 illustrate an example of the operation of the navigations system 100. Starting with FIG. 2, there is illustrated an example of a user that is located at Carnegie Hall and inputs two locations, the Guggenheim museum and the Alamo Drafthouse in Brooklyn. The map in FIG. 2 shows the map that would be rendered by the navigation application 119. The steps for the method 205 include entering the destination and waypoint (step 207) and mapping of the route (step 209) by the navigation application 119. FIG. 3 shows what happens when the network determines that acquaintance John S is at the Empire State building (see destination matrix 301). The system 100 may have information about John S. stored with information about the user. The information may include instructions that if John S. is in the vicinity of the user the system will alert the user and offer directions to the location of John S. Method 303 includes the network software detecting John's location (step 307), and then offering a waypoint proposal to the user (step 309). In this example the user may accept the waypoint proposal (step 311) and then the path and waypoints are changed on the user's device (step 313). The resulting path is illustrated in chart 303. FIG. 4 shows what happens when the network determines that the time is close to lunchtime. The system 100 may have information about what time the user usually eats lunch as well as the user's favorite restaurants.

The navigation system 100 provides the following functionality: (1) the navigation system 100 provides a semi-automated component that interactively receives and helps to plan navigation through the proposal of waypoints; (2) the navigation system 100 accepts moving targets (a person or event) and non-specific arrival times (e.g. "sometime this morning"), (3) the navigation system 100 allows selection by context/category and provides real-time notifications of new events matching a user's profile/context.

The navigation system 100 will opportunistically choose locally best solutions along a path of waypoints in navigation selection. The navigation system 100 can maximize choice (options) and/or timing (fastest) and the user can interactively verify, reject, and modify the system's planned path. These interactions (input through typical gesture, speech, or other multimodal methods) help to formulate a continuous "human-in-the-loop" navigation solution. One example is going for a specific breakfast destination, but a social calendar announcement places user-desired band performing live nearby. The navigation system 100 offers the concert venue as a modified waypoint. The user accepts the modified waypoint. The result may be that user eats breakfast with a 15 minute delay but gets to attend the performance that would otherwise be missed. Adding to this AR/VR interaction, waypoints and specific destinations can be ephemeral for user interaction; a long, continuous list can be created for the user throughout the session, but he or she does not need to remember and adjust for each of these through the entire session.

The navigation system 100 may accommodate moving target destinations for waypoints and non-predetermined timing for arrival. For example, on a return home path the user wants to meet several friends within a city. Without knowing exact schedules or locations, the friends are selected as waypoints and the system opportunistically plans the path for the user's day of activities. This can include specific events (meeting at a spa) or continuous and informal meetings (walking down the street).

The navigation system 100 provides for selection of destination by context (commerce, social, user preferences, logistics (route planning), etc.). An example here is that user's vehicle knows that the available fuel will not support the entire trip. So, the system will opportunistically choose an ideal gas station on the waypoint path with lowest cost, etc. Similarly, a list of errands could be entered with only a categorical definition of the destination and the system will auto-plan to satisfy each requirement. Some automation and learning using machine learning software 141 or machine learning application 121 may be applied from a user's profile or preferences, e.g. user likes food X during season Y.

Navigation optimization is from the perspective of the user, rather than a purely shortest-path optimization. Accordingly, what is "optimal" is user-centric. User-centric routes may not be the shortest-path, and may be inefficient, even to a great degree, when evaluated under that basic approach.

Figure 5:
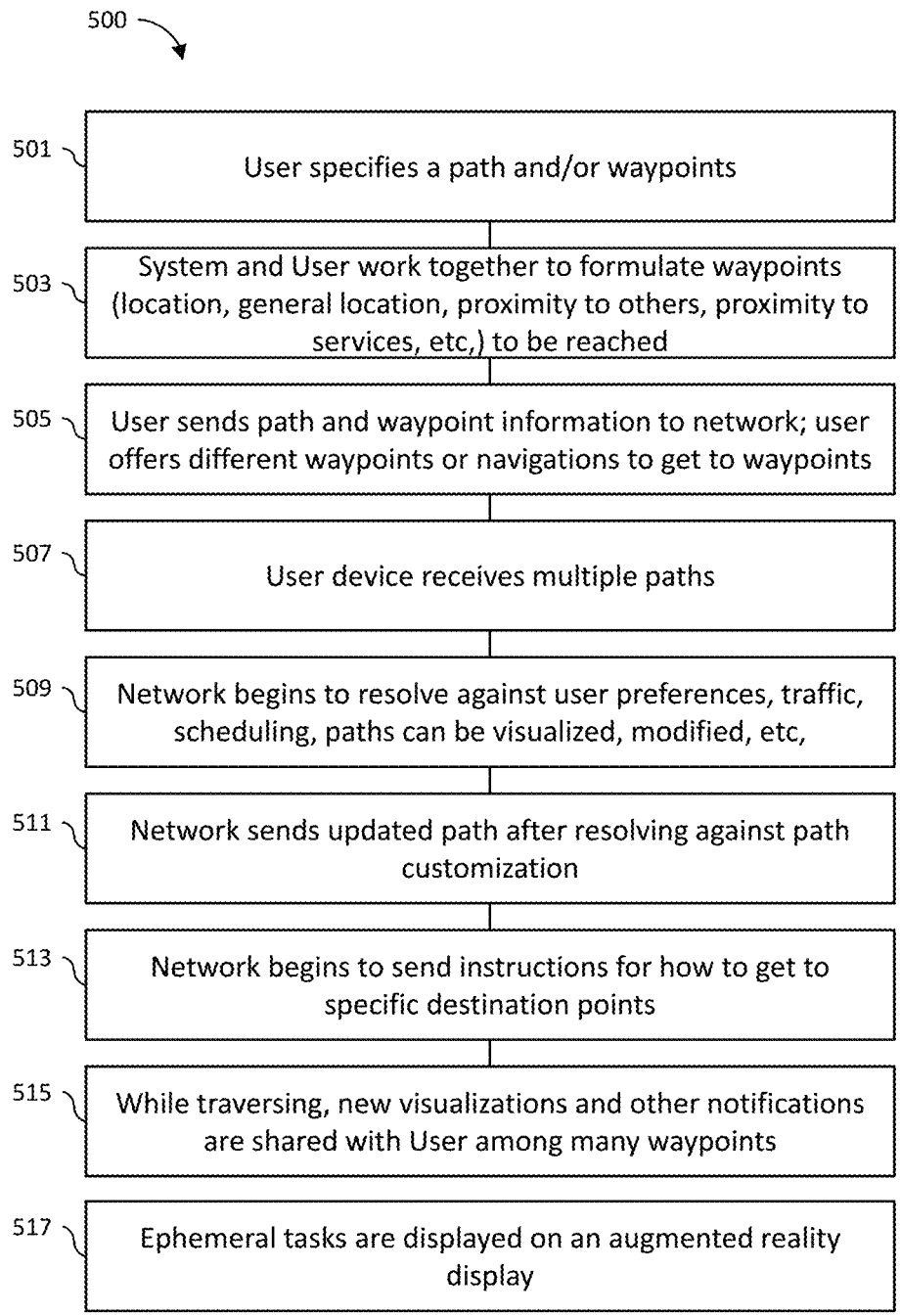
FIG. 5 is a flowchart of a method of navigation according to one embodiment.

FIG. 5 is a flowchart for an interactive navigation method 500.

In step 501, the user specifies a path and/or a number of waypoints defining a path. The path or route may include a list one or more waypoints. The list may be continuous. The path and/or the waypoints may be specified through user input into the input device 113, response to prompts from an augmented reality display, calendar ingestion, speech and the like. The tasks may be specific tasks (e.g. get gas, attend meeting, stop for lunch and the like) or moving targets (other people). The specification of the tasks and/or waypoints may not include a preferred order. The path may be displayed on a map rendered on an output device 109. The map may represent a geographical layer.

In step 503, the Navigation system 100 and the user work together to formulate waypoints to be reached. The variables used to formulate the waypoints may include location, general location, proximity to others, proximity to services, etc.

In step 505, the user sends path and waypoint information to the network 103. The user may offer different waypoints or navigations to get to waypoints. The network may offer to synchronize and manage waypoint planning and continually re-computes for best solution. The user's social connections and events from these connections, personal preferences, or profile information (e.g. likes to eat before 1 pm) may be included as variables to formulate modified waypoints. A "wish list" or other lower priority items may also be included. Contextual items (e.g. car running out of gas or pop-up wine tasting) may also be added.

In step 507, the user receives suggested multiple paths from the network 103. The paths may include one or more modified waypoints. The suggested multiple paths may be based on multiple data sources, for example current traffic conditions, time to destination, other destinations of interest along the route, available fuel left in the vehicle, and new or existing appointment obligations from a digital calendar. The paths and/or waypoints may be weighed for route optimization.

In step 509, the network resolves path and waypoint information against user preferences, traffic, scheduling, etc. The paths may be displayed to the user for modification by the user.

In step 511 the network 103 sends an updated path to the user after resolving against path customization. The updated path may include one or more modified waypoints. The modified waypoints can be ordered by quickest, closest, most valuable, most social, etc. Waypoints may be arbitrarily shuffled or prioritized by the user (to be required, skipped, optional).

In step 513 the network 103 begins to send instructions for how to get to specific destination points.

In step 515, while traversing, new visualizations and other notifications are shared with the user among many waypoints. Updates to the waypoint list may be paused, or updates to the display may be paused while the waypoint list continues to be updated. For example, a view may be paused based on an indication from the user to pause the updates to the display. As another example, updates to the view may be paused automatically when a user interaction is received, and may resume after receiving an indication from the user to resume updates, or may automatically resume after a period without further interaction from the user.

In step 517 ephemeral tasks are displayed on an augmented reality display. the system 100 continues to navigate while interacting with ephemeral notifications (temporary and just-in-time) such that user does not need to remember or fully map selected path.

Figure 6:
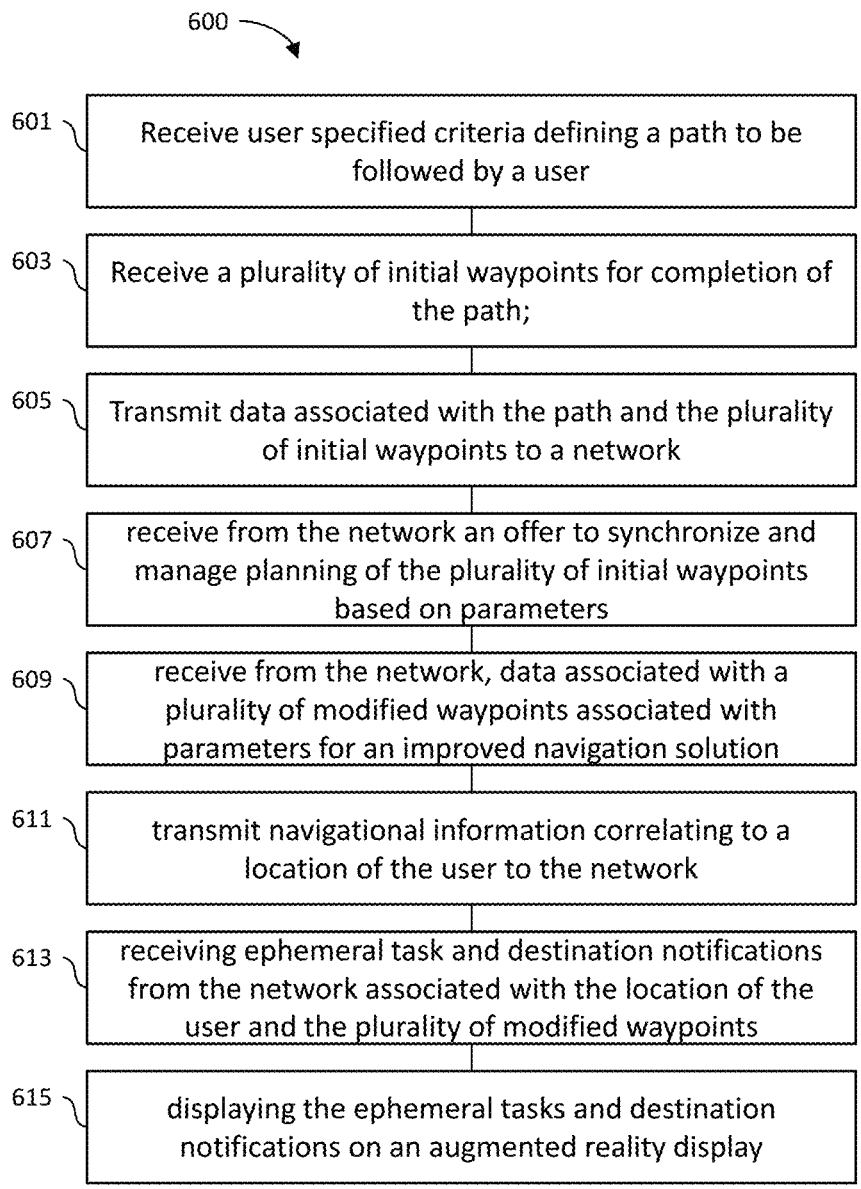
FIG. 6 is a flowchart of a method of navigation according to one embodiment.

FIG. 6 is a flowchart of a navigation method 600 as implemented in user device 101, according to one embodiment.

In step 601 the user device 101 receives user specified criteria defining a path to be followed by the user. The user specified criteria may include one or more destinations and waypoints. In the example of FIG. 2 the destination may be the Alamo Drafthouse in downtown Brooklyn. The specified criteria may be provided by the user through input device 113, which may be a keyboard, In step 603 the user device 101 receives information describing a plurality of initial waypoints for completion of the path. In the example of FIG. 2 the waypoint may be the Guggenheim museum. The information may be input by the user through input device 113, and may be a response to an augmented reality display, an input from a user or other calendar, speech, etc. User input may be associated with specific tasks (get gas), destinations (restaurant) or categorical information (e.g. food, shopping, furniture, café, skate park, entertainment).

In step 605 the user device 101 transmits data associated with the path and the plurality of initial waypoints to the network 103.

In step 607 the user device 101 receives from the network 103 an offer to synchronize and manage planning of the plurality of initial waypoints based on a set of parameters associated with the user and the location of the user. The network continually re-computes the waypoints for improved solution. The parameters may include proximity of an individual associated with the user. So for example, if the network determines that a friend of the user is in the vicinity of the path it may offer the user a modified waypoint where the user can meet the friend. The parameters may include user preferences. So for example the user may include a lunchtime preference, restaurant preferences, other entertainment preferences and the like. The parameters may include the time of day. So for example if the time is close to noon the network 103 may offer the user a modified waypoint corresponding to a restaurant listed in the user preferences. The parameters may include appointments in the user's calendar. The parameters may include specific tasks (e.g. get gas, wash car, pick up groceries, etc.) to be performed by the user. The parameters may be categorical (e.g. food. shopping, furniture, café, skate park, entertainment) and associated with the location of the user. The parameters may include the user's social connections and events for the social connections. The waypoints may be ordered by according to ordering criteria, for example, quickest, closest, most valuable, most social, etc. The parameters may be contextual. For example, contextual parameters may include the user's car running low on gas or the occurrence of a pop-up wine tasting. The user may select the modified waypoints or arbitrarily shuffle or prioritize them. For example the user may select the modified waypoint as required. Alternately the user may skip the modified waypoint or may identify the modified waypoint as being optional.

Based on the selection by the user, in step 609 the user device 101 receives from the network data associated with a plurality of modified waypoints associated with the parameters for an improved navigation solution. The modified waypoints may be ordered by quickest, closest, most valuable, most social, etc. The modified waypoints may be arbitrarily shuffled or prioritized by user (to be required, skipped, optional). The modified waypoints may be rendered on a map displayed on the user device 101 wherein the map may represent a geographical layer.

Illustrated as step 611 is the transmission of the user location information which may be continuously transmitted to the network.

In step 613, the user device 101 may receive ephemeral tasks and destination notification from the network 103. The ephemeral tasks and destination notification may be associated with the location of the user and the plurality of modified waypoints.

In step 615, the user device 101 may display the ephemeral tasks and destination notifications on an augmented reality display. The system 100 continues to navigate while interacting with ephemeral notifications (temporary and just-in-time) such that user does not need to remember or fully map selected path. Navigation may use one or more layers: a geographical layer, a user layer, and/or an augmented reality (AR) layer.

The method may be used for delivery logistics for pickup and delivery of packages because of new opportunistic events (newly scheduled, cheaper fuel cost, etc.); based more on a dynamic need that the system gets while in-process. The system 100 may be federated to other notification systems (audio, haptic, etc.) for new planning and opportunity notifications (and subsequent user interaction). The algorithm may be applied to other on demand commerce such as ride sharing. An improved number of waypoints (fewer, more) may be created based on known time constraints traffic, and distance to cover between all requirements. The system may also be coupled with more passive needs of user (e.g. wish list that can be chosen). Security of origin and destination choice may be provided via masking waypoints (e.g. take a long-way to a sub-user's favorite birthday restaurant). Instead of actually driving, the user may pick waypoints with augmented reality functionality and navigate to the waypoints, letting car/system figure out the rest. The system 100 may enable the user to set a moving target as a waypoint. For example, if a friend of the user is also driving around town, this could be a nonintrusive way of "running into them" such that the user's navigation is automatically planned as long as it hits the target at some point in my journey. Another functionality of the system 100 may be to attach a specific time to be at a waypoint. For example the user may instruct the system 100 to take the user to a Starbucks for lunch, which has a specific time but not a specific location. Selection of waypoints may be through the use of a touch screen in conjunction with an augmented reality map.

Waypoints can be ephemeral for user interaction; a long continuous list can be created but the user throughout the session, but the user does not need to remember and adjust for each of these throughout the entire session. Updates to the waypoint list may be paused, or updates to the display may be paused while the waypoint list continues to be updated. For example, a view may be paused based on an indication from the user to pause the updates to the display. As another example, updates to the view may be paused automatically when a user interaction is received, and may resume after receiving an indication from the user to resume updates, or may automatically resume after a period without further interaction from the user. An augmented reality layer may also be used. A user may provide indicators for the treatment of one or more waypoints. For example, a user may indicate that one or more waypoints or types of waypoints are "attractors" or "repulsors." These indications may be received as symbols. A user may, for example, provide one or more input strokes to create a symbol.

The methods described in the examples may be embodied directly in hardware, in a software module executed by a processor, or in a combination of the two. A software module may reside in any form of memory or storage medium such as RAM memory, flash memory, ROM memory, EPROM memory, EEPROM memory, registers, hard disk, a removable disk, a CD-ROM. The memory or storage medium may be coupled to the processor such that the processor can read information from, and write information to, the memory or storage medium. Alternatively, the storage medium may be integral to the processor. The processor and the storage medium may reside in an ASIC. In some aspects, the steps and/or actions of a method may reside as one or any combination or set of codes and/or instructions on a machine readable medium and/or computer readable medium, which may be incorporated into a computer program product.

In any of the exemplary embodiments, the described functions may be implemented in hardware, software, firmware, or any combination thereof. Functions implemented in software may be stored on or transmitted over as instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed:

1. A method comprising:
   receiving in a network device from a user device a destination for a user;
   receiving, at the network device, navigational information correlating to a location of the user;
   receiving in the network device navigational information about a path that includes one or more waypoints;
   receiving task information from the user in the network device;
   accessing a set of parameters associated with the user, wherein the set of parameters comprises parameters selected from among a group comprising traffic conditions, proximity of an individual, social connections, user preferences, time of day, appointments in a calendar, the task information, and categorical parameters;
   accessing a machine learning software on the network device
   processing using the machine learning software the navigational information and the set of parameters and the location of the user to infer user preferences;
   determining a modified waypoint based on the user preferences;
   transmitting from the network device to the user device, data associated with the modified waypoint for an improved navigation solution;
   transmitting, from the network device to the user device, instructions to provide the user with an option to accept the modified waypoint;
   receiving an indication that the user has accepted the option to accept the modified waypoint; and
   transmitting, from the network device to the user device, task and destination notifications associated with the location of the user and the modified waypoint adapted to be displayed on an augmented reality display on the user device, wherein the navigation solution is provided from a perspective of the user and not a shortest path optimization.

2. The method of claim 1 further comprising:
   transmitting from the network device an offer to synchronize and manage planning of the modified waypoint, wherein the offer to synchronize and manage is triggered by a trigger event; and
   receiving at the network device, an acceptance of the offer to synchronize and manage planning of the modified waypoint.

3. The method of claim 1 wherein the modified waypoint is ordered according to an ordering criteria.

4. The method of claim 3 wherein the ordering criteria comprises an ordering criteria selected from among a group comprising quickest, closest, most valuable, most social.

5. The method of claim 1 wherein ephemeral tasks and destination notifications are provided to one or more of a visual display, an audio device, or a haptic device.

6. The method of claim 5 wherein the ephemeral tasks and destination notifications are provided to an augmented reality display.

7. A system comprising:
   a processor;
   network storage device in communication with the processor wherein the processor is configured to execute an application stored in the network storage device for performing operations comprising:
   receiving in a network device from a user device a destination for a user;
   receiving, at the network device, navigational information correlating to a location of the user;
   receiving in the network device navigational information about a path that includes one or more waypoints;
   receiving task information from the user in the network device;
   accessing a set of parameters associated with the user, wherein the set of parameters comprises parameters selected from among a group comprising traffic conditions, proximity of an individual, social connections, user preferences, time of day, appointments in a calendar, specific tasks, and categorical parameters;
   accessing a machine learning software on the network device
   processing using the machine learning software the navigational information and the set of parameters related to the user to infer user preferences;
   determining a modified waypoint based on the user preferences;
   transmitting, from the network device to the user device, data associated with the modified waypoint for an improved navigation solution;
   transmitting, from the network device to the user device, instructions to provide the user with an option to accept the modified waypoint;
   receiving an indication that the user has accepted the option to accept the modified waypoint; and
   transmitting, from the network device to the user device, task and destination notifications associated with the location of the user and the modified waypoint adapted to be displayed on an augmented reality display on the user device, wherein the navigation solution is provided from a user perspective and not a shortest path optimization.

8. The system of claim 7 further comprising:
   transmitting from the network device an offer to synchronize and manage planning of the modified waypoint, wherein the offer to synchronize and manage is triggered by a trigger event; and
   receiving at the network device, an acceptance of the offer to synchronize and manage planning of the modified waypoint.

9. The system of claim 7 wherein the modified waypoint is ordered according to an ordering criteria.

10. The system of claim 9 wherein the ordering criteria comprises an ordering criteria selected from among a group comprising quickest, closest, most valuable, most social.

11. The system of claim 7 wherein ephemeral tasks and destination notifications are provided to one or more of a visual display, and audio device, or a haptic device.

12. The system of claim 11 wherein the ephemeral tasks and destination notifications are provided to an augmented reality display.

13. A non-transitory computer readable medium comprising computer executable instructions embodied in a computer readable medium and when executed by a processor of a computer performs steps comprising:
   receiving in a network device from a user device a destination for a user;
   receiving, at the network device, navigational information correlating to a location of the user;

receiving in the network device navigational information about a path that includes one or more waypoints;

receiving task information from the user in the network device;

accessing a set of parameters associated with the user, wherein the set of parameters comprises parameters selected from among a group comprising traffic conditions, proximity of an individual, social connections, user preferences, time of day, appointments in a calendar, the task information, and categorical parameters;

accessing a machine learning software on the network device processing using the machine learning software the navigational information and the set of parameters and the location of the user to infer user preferences;

determining a modified waypoint based on the user preferences;

transmitting from the network device to the user device, data associated with the modified waypoint for an improved navigation solution;

transmitting, from the network device to the user device, instructions to provide the user with an option to accept the modified waypoint;

receiving an indication that the user has accepted the option to accept the modified waypoint; and transmitting, from the network device to the user device, task and destination notifications associated with the location of the user and the modified waypoint adapted to be displayed on an augmented reality display on the user device, wherein the navigation solution is provided from a perspective of the user and not a shortest path optimization.

14. The non-transitory computer readable medium of claim 13 further comprising:

transmitting from the network device an offer to synchronize and manage planning of the modified waypoint, wherein the offer to synchronize and manage is triggered by a trigger event; and receiving at the network device an acceptance of the offer to synchronize and manage planning of the modified waypoint.

15. The non-transitory computer readable medium of claim 13 wherein the modified waypoint is ordered according to an ordering criteria.

16. The non-transitory computer readable medium of claim 15 wherein the ordering criteria comprises an ordering criteria selected from among a group comprising quickest, closest, most valuable, most social.

17. The non-transitory computer readable medium of claim 13 wherein ephemeral tasks and destination notifications are provided to one or more of a visual display, an audio device, or a haptic device.

* * * * *